Jan. 20, 1931. F. H. AULD 1,789,288
MANUFACTURING MATERIAL FOR AIRPLANE USES
Filed March 29, 1929 2 Sheets-Sheet 1
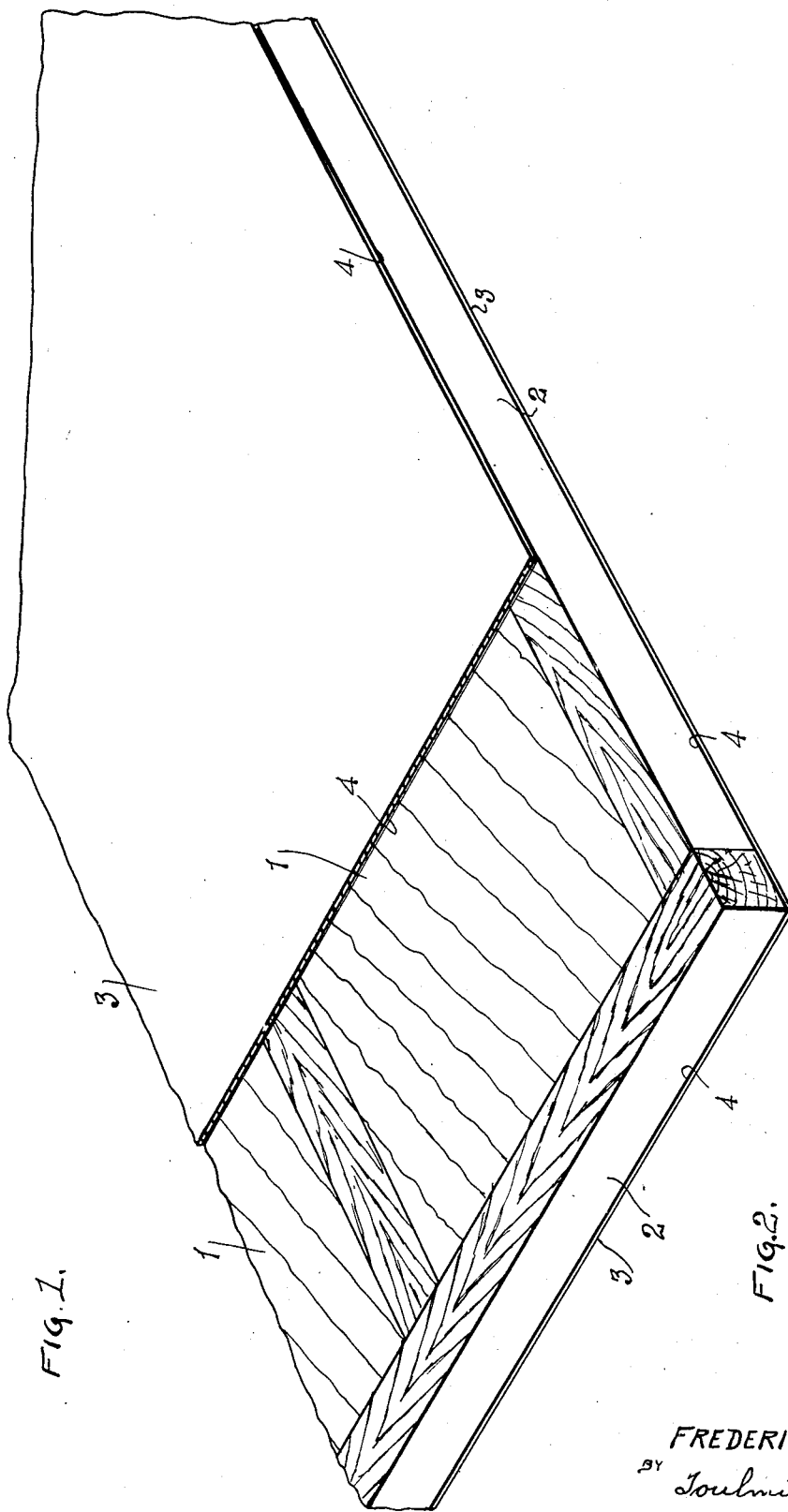
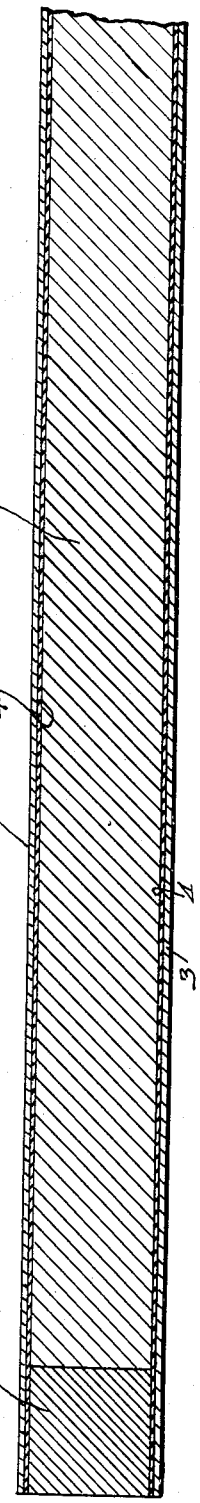
Inventor
FREDERICK H. AULD,
BY Toulmin & Toulmin
Attorneys Jan. 20, 1931. F. H. AULD 1,789,288
MANUFACTURING MATERIAL FOR AIRPLANE USES
Filed March 29, 1929 2 Sheets-Sheet 2
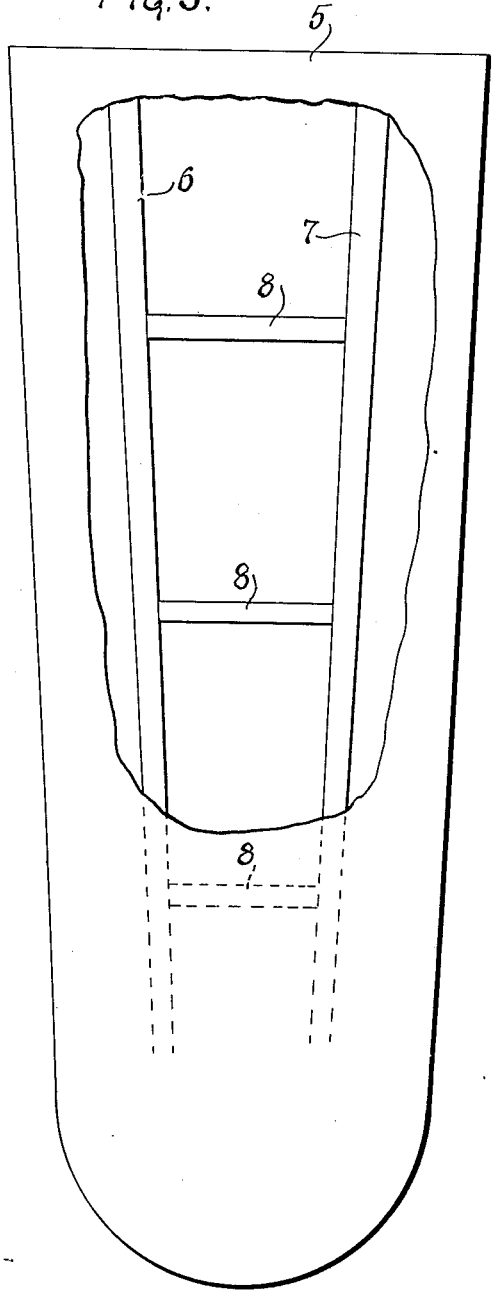
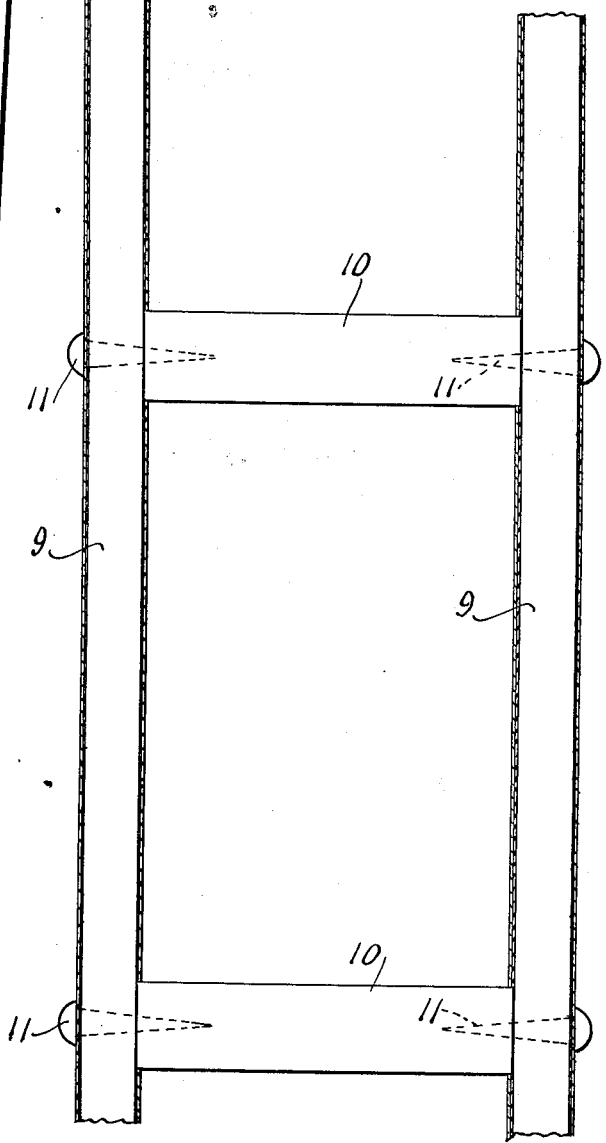
INVENTOR
FREDERICK H. AULD,
BY
Toulmin & Toulmin
ATTORNEYS Patented Jan. 20, 1931

1,789,288

UNITED STATES PATENT OFFICE

FREDERICK H. AULD, OF COLUMBUS, OHIO

MANUFACTURING MATERIAL FOR AIRPLANE USES

Application filed March 29, 1929. Serial No. 351,051.

This invention relates to improvements in laminated materials and especially in such materials adapted for use in airplane wings, and in making the fuselage and the interior cabinet work and flooring of airplanes, and has for its object the production of a complete sheet composed of a layer of wood and surface layer or layers of metal, preferably aluminum, united to the layer of wood by a suitable adhesive binder. The wood preferably used for this purpose is a light wood and soft, such as balsa wood. The sheets of light wood are to be reenforced by strips of a stronger wood, such as spruce.

The composite material thus formed has among other distinctive characteristics the following: It is light, very rigid, durable and strong, more nearly having the strength of metal than any other similar material now known. It will not warp or lose its shape due to the effect of weather. These qualities are due to the structure and materials of which it is made, consisting of an inner layer of light wood and outer layer or layers of metal or alloys of metal, preferably aluminum, united by some suitable binding material, preferably sheets of celluloid the surfaces of which have been previously partially dissolved for the purpose of making the layer of wood and the layer or layers of metal adhere to each other. The partially dissolved surfaces of the sheet of celluloid form gummy or adhesive surfaces, while the undissolved remainder constitutes a further element forming intervening layer or layers between layers of metal and the wood. This material is applicable for use in interior cabinet work, flooring, wing spars and various parts of the wing where great rigidity and strength are needed.

Though this composite material is well adapted for use in making the floors, walls and trim of the fuselage of airplanes, yet in the present drawings only one of the preferred uses thereof is shown. In these drawings it is shown as used for making the spars and struts of airplane wings.

This material is made of a layer of aluminum, layer of celluloid, and intermediate layer of light wood, preferably balsa, with reenforcing strips of stronger wood, preferably spruce, then a layer of celluloid and the top a layer of aluminum.

The main purpose of this invention is to form a composite structure that has a great deal of rigidity, combined with light weight and structural strength.

Referring to the drawings:

Figure 1 is a perspective view of this composite material showing the metal and the intervening layer of celluloid removed from one part thereof.

Figure 2 is a cross section through the composite sheet showing the layers of wood, metal and celluloid.

Figure 3 is a plan view of one end of an airplane wing, with part of the wing broken away to show the spars and struts.

Figure 4 is a cross section of a box spar.

As shown in Figures 1 and 2 this invention relates to laminated structures consisting of an intermediate layer of wood composed of soft light wood, such as balsa wood, indicated by the numeral 1, outer layer of metal or alloys of metal, and intervening layers of celluloid. The soft light wood is strengthened by strips of stronger wood, such as spruce. These strips are indicated by the numeral 2. The outer layers of metal, preferably aluminum, are indicated by the numeral 3, while the intervening layers of celluloid, used for the purpose of binding the layer of wood and layers of metal together, are indicated by the numeral 4.

Instead of there being outer layers of aluminum and the intermediate layer of wood, there may be only one outer layer of aluminum with the layer of wood and the intervening layer of celluloid. The purpose of the invention is to form a structure composed of a layer of light wood and a layer or layers of metal or an alloy of metal. While any suitable binding material may be used, it has been found in practice that the layers may be held together by the use of sheets of celluloid, of which the faces have been partially dissolved by some suitable solvent, and these sheets of partially dissolved celluloid are placed between the metal and the wood and the layers subjected to heat and pressure sufficient to cause the parts to adhere, and to form a consistent laminated structure. The laminated structure thus formed is composed essentially of five layers, an inner layer of wood, outer layers of metal or alloy, and intervening layers of sheets of celluloid.

The strips of spruce are for the purpose of adding rigidity to the layer of light wood, and while it has been found in practice that spruce is well adapted for this purpose, other woods may be used in connection with the lighter wood. The purpose of the invention is to form a composite structure that has a great deal of rigidity and strength, and a minimum of weight.

In forming the composite structure the layers may be superimposed upon each other without any necessary previous treatment. Heat and pressure are then applied to a sufficient extent to partially dissolve the celluloid, if it has not been previously dissolved, preferably in sheet form to constitute a binder.

It has been found that usually about 140 to 150 degrees centigrade temperature, and a pressure of about 500 pounds per square inch are about right to effect the binding of the materials. The heat and pressure are usually maintained for a period of about thirty minutes to sixty minutes. If the celluloid sheets are partially dissolved before they are made a part of the composite stock, less heat and pressure may be used in the formation of the composite stock, and these values, of course, depend upon the operating conditions and upon the nature of the surfaces to be joined, and the thicknesses of the bodies to be united. In general, however, the above-mentioned temperatures and pressures are about right for developng the most satisfactory degree of adhesiveness on the celluloid sheet surfaces for the purposes for which this invention is specifically applied.

The thickness of the layer of wood may be varied to suit the particular needs, and the number of strips of heavier wood may be varied to suit the purposes, or entirely omitted, but it is preferable to use some of these strips in order to give the necessary rigidity and sufficient body to the composite sheet. The layers of metal may be varied in thickness, the thickness of the layers being determined by the use to which the sheet is to be applied and the amount of strength and rigidity necessary, and while this structure of composite material is particularly adapted for flooring and the interior trim of the fuselage, it may be as well used for forming the spars and struts of airplane wings. In Figures 3 and 4 the use of this composite material for this purpose is illustrated.

The airplane wing is designated by the numeral 5. In the part of the wing here shown there are two transverse spars running longitudinally of the wing but transverse the direction of the airplane. One of these spars is a front spar 6, and the other a rear spar 7. Between these spars and cooperating with them for the purpose of giving form and shape to the wing, there are drag struts 8. As shown in Figure 3, there are three of these drag struts, located between the two spars. The number of spars and the number of drag struts may be varied to meet the required conditions. The spars and drag struts here shown and illustrated are made of this composite material, which is well adapted to give to the wing strength and rigidity and lightness required in airplanes.

In Figure 4 there is illustrated a box spar, of which the parts or walls are composed of this composite material, and are designated by the numeral 9. The similar edges of the parts 9 are united by spruce blocks 10. When these parts are united, as shown in Figure 4, there is produced a rectangular structure which forms the framework of the wing of an airplane and gives the wing shape and rigidity.

At the point where the blocks 10 unite with the parts 9, the metal is cut away so that the wood comes in direct contact and the parts are held by means of screws, as indicated by the numeral 11.

The qualities sought and obtained by reason of this invention are extreme lightness, with great strength and rigidity and durability, as the light wood core furnishes the body with the element of lightness inherent therein, and the metal or alloy covering together with the reenforcing strips of stronger wood, furnish the element of strength against bending, and especially strength to maintain the material straight and firm against bending strains.

I desire to comprehend within my invention such modifications as may be clearly embraced within my claims and the scope of my invention.

Having thus fully described my invention, what I claim is new and desire to secure by Letters Patent, is:

1. A composite laminated structure comprising a body or core of light wood, a reenforcement of stronger wood, a surface of material of a metallic nature, and a binding medium between the wood and the surface material to effect their union, said medium consisting of sheets of celluloid having surfaces that have been partially dissolved.

2. In a laminated structure for airplanes, a layer of light wood reenforced by strips of stronger wood, a layer of metal, and a cementing medium for binding said layers together, said medium consisting of sheets of celluloid having surfaces that have been partially dissolved.

3. In an airplane, a composite structure therefor, said structure consisting of a core of light wood reenforced by strips of stronger wood, surface plates of metal, and a cementing medium consisting of celluloid binding said core to said plates of metal.

4. In an airplane, a composite structure therefor, said structure consisting of a core of light wood, surface plates of aluminum, and a cementing medium for said core and plates consisting of sheets of celluloid having surfaces that have been partially dissolved.

5. In an airplane, a composite structure therefor, said structure consisting of a core of light wood reenforced by strips of stronger wood, surface plates of aluminum, and a cementing medium for said core and plates consisting of sheets of celluloid having surfaces that have been partially dissolved.

6. In an airplane, a composite structure therefor, said structure consisting of an inner layer of aluminum, an outer layer of aluminum, an intermediate layer of light wood, and intervening layers of sheets of celluloid having surfaces that have been partially dissolved to bind the wood to the aluminum.

7. In an airplane, a composite structure therefor, said structure consisting of an inner layer of aluminum, an outer layer of aluminum, an intermediate layer of light wood strengthened by strips of stronger wood, and intervening layers of sheets of celluloid having surfaces that have been partially dissolved to bind the wood to the aluminum.

8. A spar structure for airplane wings consisting of a core of wood, surface plates of metal, and a cementing medium consisting of sheets of celluloid having surfaces that have been partially dissolved.

9. A spar structure for airplane wings consisting of a core of light wood reenforced by strips of stronger wood, surface plates of metal, and a cementing medium consisting of sheets of celluloid having surfaces that have been partially dissolved.

10. A spar structure for airplane wings consisting of a core of wood, surface plates of aluminum, and a cementing medium consisting of sheets of celluloid having surfaces that have been partially dissolved.

11. In a composite laminated structure, a core composed of light wood, a surface of sheet metal, and a cementing medium for binding said core to said layer of sheet metal, said cementing medium consisting of sheets of celluloid.

In testimony whereof, I affix my signature.
FREDERICK H. AULD.